G. CASTAGNERIS.
WING ARRANGEMENT FOR FLYING MACHINES CARRYING GREAT LOADS.
APPLICATION FILED JAN. 19, 1918.
1,318,845.                              Patented Oct. 14, 1919.
2 SHEETS—SHEET 1.
Fig. 1.            Fig. 2.            Fig. 3.
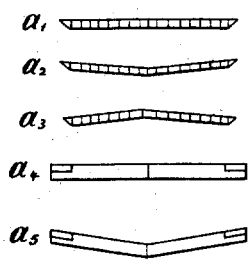
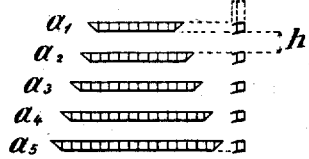
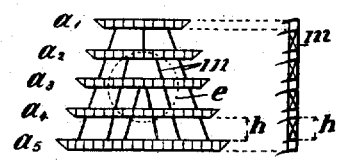
Fig. 4.            Fig. 5.            Fig. 6.
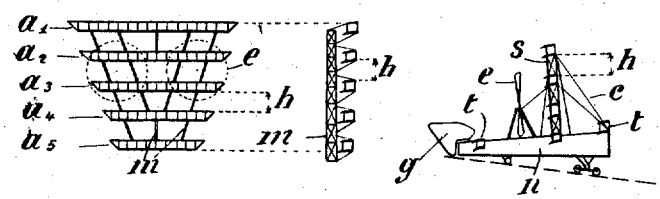
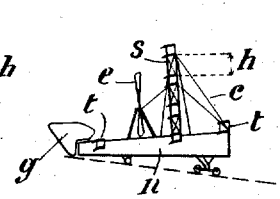
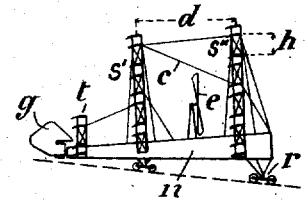
Fig. 7.
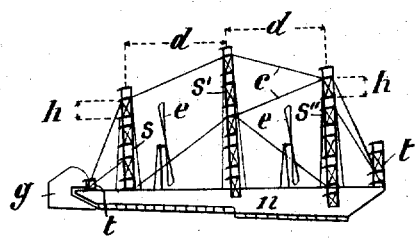
Fig. 8.
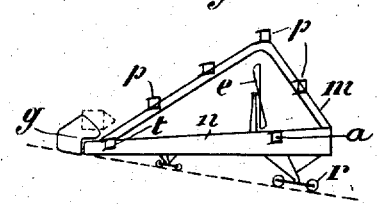
Fig. 9.
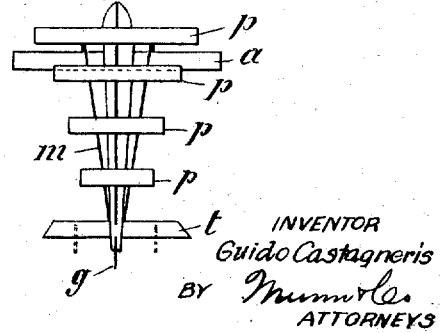
Fig. 10.
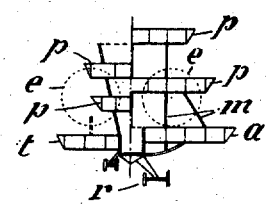
INVENTOR
Guido Castagneris
BY Munn & Co.
ATTORNEYS G. CASTAGNERIS.
WING ARRANGEMENT FOR FLYING MACHINES CARRYING GREAT LOADS.
APPLICATION FILED JAN. 19, 1918.
1,318,845.          Patented Oct. 14, 1919.
                    2 SHEETS—SHEET 2.
Fig.11.             Fig.12.
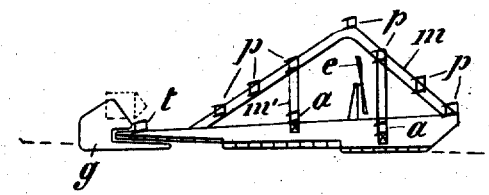  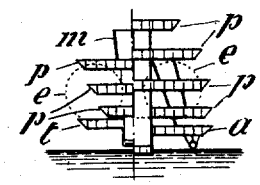
Fig.13.             Fig.14.
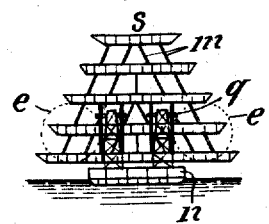  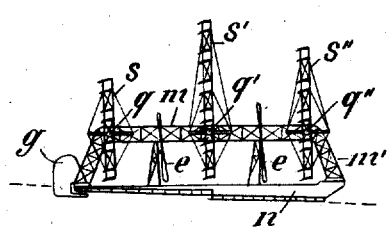
Fig.15.             Fig.16.
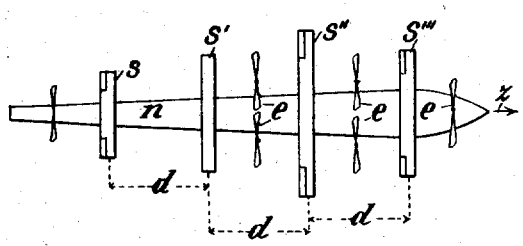  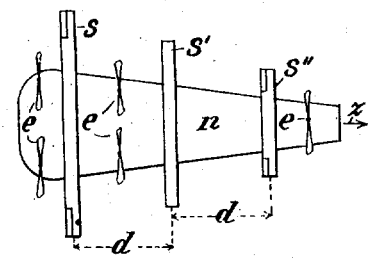
Fig.17.     Fig.18.             Fig.19.
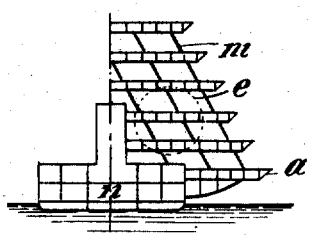  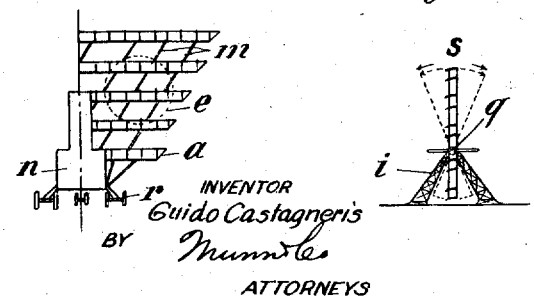  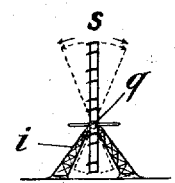
INVENTOR
Guido Castagneris
BY Munn & Co
ATTORNEYS
THE COLUMBIA PLANOGRAPH CO., WASHINGTON, D. C.

UNITED STATES PATENT OFFICE.

GUIDO CASTAGNERIS, OF ROME, ITALY.

WING ARRANGEMENT FOR FLYING-MACHINES CARRYING GREAT LOADS.

1,318,845. Specification of Letters Patent. Patented Oct. 14, 1919.

Application filed January 19, 1918. Serial No. 212,764.

*To all whom it may concern:*

Be it known that I, GUIDO CASTAGNERIS, a subject of the King of Italy, residing at Rome, in the Kingdom of Italy, have invented new and useful Improvements in Wing Arrangements for Flying - Machines Carrying Great Loads, of which the following is a specification.

In aviation the problem of transport of great loads, and hence of flight to great distances is difficult to solve on account of certain inconveniences intrinsically inherent to the various forms of supporting surfaces adopted hitherto, the monoplane, the biplane, and the multiplane.

In fact, with the monoplane surfaces, as with the biplane one, the percentage of carried load diminishes as the dimensions increase, since the weight of framework requisite for stiffening such surfaces rapidly increases. In addition to this, when, on increasing the dimensions of the said wing surface, and of power necessary for propulsion, use must be made of several driving plants in separate units and distributed along the wing surfaces, the latter must be endowed with greater stiffness and strength and consequently must be heavier.

In the multiplane form, made up of several monoplane surfaces placed over each other, there exist, first and foremost, conditions of low efficiency for the intermediate surfaces on account of the perturbations in the air current meeting them through the vicinity of the surfaces above and below. Whence arises the necessity of arranging the various monoplane surfaces at a greater distance from each other than is permissible in biplane constructions, in order that each may suffer as little as possible from the influence of the two neighboring surfaces above and below respectively.

Such increased spacing out however, entails a greater strength and weight in the connecting frames, and in the surfaces themselves, and augments the surface of the framework exposed to the wind. On this account, also with multiplane form as hitherto adopted and proposed, it is found that, with the increase in dimensions, either the passive resistance increases, or the percentage of transportable useful weight diminishes notably, and hence this form too gives unsatisfactory results when exceeding certain proportions.

According to the present invention, the aforesaid inconveniences peculiar to the multiplane surface are eliminated by giving an arrangement to the supporting surfaces out of which it is formed, such as to get the maximum aerodynamic efficiency from each of them while yet maintaining great lightness and strength of construction, so as to obtain the maximum lifting power with a view of conveniently transporting great loads to great distances.

Such result is attained by assuming the biplane wing surface, instead of the monoplane, as the elementary unit for the formation of the multiplane surface; the latter, thus resulting from several biplane wing surfaces, arranged either vertically or longitudinally at such intervals and in such relative positions as to practically reduce the perturbing influence to zero or to a minimum.

The advantage of employing biplane wing surfaces instead of monoplane is easily understood when the structure of the biplane surface with its trussed framework, in itself rigid, strong and light, is considered. The said structure allows of spacing out the biplane surfaces as much as may be required from each other, and such without the need of reinforcing them, and this consequently allows the employment of simple and convenient connecting framework between any one biplane surface and the adjacent one, beneath or above, in order to form the wing system which is the object of the present invention.

In the drawing appended herewith, which illustrates different ways of combining the biplane elements for forming one multiplane according to the present invention, Figure 1 shows, in front elevation, and in plan, some forms of biplane wing adopted as elementary units in the aviation apparatuses according to the present invention.

Fig. 2 shows, in front elevation, with a cross section at the side, one of the arrangements of the biplane elements adapted for forming the wing surface of the aviation apparatuses according to the present invention.

Figs. 3 and 4 show in front elevation, with sections beside, two ways of arranging groups of biplane surfaces and their connection together with their respective frameworks.

Figs. 5, 6, 7 show in side elevation three different forms of air-craft with biplane surfaces arranged in alar columns.

Figs. 8, 9, 10 show in side elevation, in plan, and in section respectively a form of construction with biplane surfaces grouped together on a bridge shaped support.

Figs. 11 and 12 show in side elevation and in section another form with biplane surfaces grouped together on a more complex bridge shaped support.

Figs. 13 and 14 show in side elevation, and front view, a form of construction with bridge shaped support combined with alar columns.

Figs. 15 and 16 show in plan two forms of construction with alar columns on the type of those in Figs. 5, 6, 7.

Figs. 17 and 18 are partial sections intended to show the arrangement and form of the car with respect to the wing surfaces.

Fig. 19 shows a particular form of connection between an alar column and the car.

In all the figures, identical reference letters indicate similar and corresponding parts.

The elementary unit with which the multiplane wing surfaces are formed, according to the present invention, is the ordinary biplane cell of any approved form, whether rectilineal, Fig. 1, —$a_1$—, or bent at a diedral angle upward and downward, Fig. 1, —$a_2$—, —$a_3$—, and each of these forms also rectilineal in plan or arrow shaped as shown in Fig. 1, —$a_4$—, —$a_5$—.

Of these biplane elements a sufficient number is taken for getting the desired lifting power, and arranged into one or more groups, distributing them in such a manner that neither by reason of the distance or of their relative position they may disturb each other. The various elements thus distributed are properly connected with each other and to the car by means of one or more frameworks so arranged as to secure the maximum strength with the minimum weight and with the minimum head resistance.

In order to insure freedom of the various elements from reciprocal disturbance, care must be taken that when they are arranged vertically over each other the gap —$h$— between two successive elements —$a_1$—, —$a_2$—, —$a_3$—, Fig. 2, be greater than the intervening distance between the two planes of each cell. If however the elements are not arranged vertically over each other, but, placed behind each other then the distance must be such that each element following any other one falls out of the wake of the foregoing one. This distance is notably reduced by arranging the successive elements at different heights.

The elements adopted may be of equal or unequal wing spread.

Figs. 3 and 4 show two groups of biplane elements arranged according to the aforesaid rules vertically over one another and of various length, decreasing from below upward in the example of Fig. 3, and decreasing from above downward in the example of Fig. 4. The variation of the length is with a view of securing a better efficiency and greater lifting power of the whole, while diminishing the head resistance.

For the same object the two planes of each cell instead of being equal to each other are of different depth, and preferably the inferior planes have a greater depth, as is clearly shown by the sections accompanying the frontal views of Figs. 3 and 4.

The different elements —$a_1$—, —$a_2$—, —$a_3$— are connected by frameworks —$m$— interposed as shown in Fig. 3, or supported over-hanging as shown in Fig. 4. These frameworks are constructed, in such manner as to get the greatest lightness compatible with the stress to which they are subjected and so as to offer the least resistance possible to the wind.

The arrangement indicated above gives in the same manner as all multiplane arrangements, the advantage of raising the center of pressure on the sail area with respect to the air-craft's center of gravity, and of furthermore limiting the displacements of the center of pressure in the oscillations of the apparatus, at the same time reducing the frontal projected area.

This arrangement has the peculiar advantage of great lightness and high efficiency which permit it to carry a load considerably greater than could be done with the ordinary monoplane or biplane surfaces of equal area.

If the load to be carried be much increased, it is not desirable to augment the number of surfaces superposed over each other vertically, or their frontal wing spread, in order to avoid the necessity of great height in the sheds and hangars, and not to diminsh the handiness of maneuver in the horizontal plane which is reduced on the increase of wing spread of the several elements.

It is rather desirable to make use of two, three, or more groups as those in Figs. 3 and 4, connecting them to each other and to the car —$n$—, as is shown in Figs. 5, 6, 7, with rigging —$c$— in such way as to constitute a system analogous to a vessel's masting, taking note that the distance —$d$—, between the several groups —$s$— be sufficient to avoid the disturbing influence of the surfaces which lead on those which follow, and noting also that the elements of the various groups be placed, if possible, at different heights and incidences.

The biplane elements, instead of being arranged in one or more vertical groups or "columns" —s—, may be distributed in various planes —p—, and then the framework uniting them takes the form of a single bridge truss —m— strengthened by other connecting beams —m'— fastened to the car's body when the dimensions so require, as shown in Figs. 8 and 11.

In such combinations, and also in the columnar ones, biplane elements may likewise be arranged on the car's sides themselves, as shown in —a— of Figs. 8, 10, 11, 12, 17, 18.

Finally instead of marking the truss —m— carry separate biplane elements, it can be made to carry groups —s— —s'— —s"— of elements as those in Figs. 5, 6, 7, and hence is obtained the construction shown in Fig. 14.

As is evident, the arrangement of biplane surfaces into several groups allows these surfaces to be distributed, with respect to the car, in such a way as to balance the weights concentrated in the hull, by reducing the strains to which the latter is subjected to their minimum and hence securing the maximum of stability.

The car takes different shapes according to the number and arrangement of the groups of lifting surfaces, as will be noticed for example in plan in Figs. 15 and 16, in which figures the arrow —z— indicates the direction of movement. Said figures refer to aeroplanes with wing columns of the type shown in Figs. 6 and 7, in cross section in the Figs. 10, 12, 13, 17, 18 and in longitudinal section in Figs. 5, 6, 7, 14.

The wing system thus arranged, and fastened to the car, is fitted in the usual way with longitudinal, transverse and vertical stabilizing means designed for allaying and reducing the air-craft's pitching and rolling, the craft being already stable in itself.

Such means may be, according to the purpose aimed at and to the circumstances, the warping of the wings, articulated wing tips, or other movable wing-parts, and vertical diaphragms either movable or fixed, none of which is here necessary to describe particularly as they are all well known in the art and not forming part of the present invention.

It may however be noted that the frameworks —m— which act as connecting and stiffening members of the biplane wing elements, can be made to act also as supports in the formation of the diaphragms and stabilizing surfaces in the same manner as is done with the cellular stabilizing surfaces used in dirigible balloons.

For longitudinal stability, and depth control wing elements —t— are employed, either monoplane or biplane suitably arranged, single, as shown in Figs. 5, 8, 11, or multiple as in Fig. 6, and even combining single and multiple elements together as shown in Fig. 7, which refers to the case of an aeroplane with fore and aft rudders.

Again, it will be understood that an entire wing-column, arranged at the fore or at the aft end may be made to act as an elevation rudder, and in this case it must be connected to the car by means of an articulated joint which allows of it being inclined backward or forward as shown in Fig. 19, where the column —s— is movable around a shaft —q— resting on a suitable support —i—, so that the incidence of the wing surfaces may be varied at will.

Finally, as shown by way of example in Fig. 14, all the wing columns —s— —s'— —s"— may be made movable around shafts —q—, —q'—, —q"— so as to be able to vary the incidence simultaneously or singly. This arrangement also allows the lifting power of the wing surfaces to be varied within wide limits.

For steering in the horizontal plane the vertical rudder —g— is made use of, the same suitably placed as seen in Figs. 5, 6, 7, 8, 14.

The driving plant may comprise either a single motor acting on a propeller placed in a convenient position in the longitudinal middle plane, in such a manner that the propeller's axis coincides with the resultant of the head resistance as shown for example in Figs. 5, 6, 8, 11 or several motors suitably placed with respect to the wing system, as shown in Figs. 7, 14, 15, 16.

With regard to propellers, the most convenient combination is that of few screws —e— of large diameter arranged with their axis in the longitudinal middle plane, and, if in couples, symmetrically on the two sides of said plane rotating in reverse direction and at a convenient distance from the wing planes which precede them, in such way that they may work in the least possibly disturbed air.

The screws themselves may be brought to contribute to the air-craft's steering both for direction and for altitude by adding their action to that of the rudders.

For the above said purpose puller screws are placed at the fore end and pusher screws at the aft end, at the same time providing means whereby the direction and inclination of their axis may be altered at will, so that their action be added to that of the rudders for rendering evolutions and maneuvers more rapid and easier whether in the horizontal plane or in the vertical one. When screws are thus arranged they may even substitute the rudders in case of the latter's loss or damage.

Air-craft according to the present invention may act as ordinary aeroplanes or as seaplanes. In the former case they will have one or more landing carriages with wheels —r— as shown in Figs. 5, 6, 8, 18. In the latter case, as seaplanes, they will have the hull of the car suitably formed as a boat for their floating on water as shown in Figs. 7, 11, 14 with either smooth or stepped bottom.

Claims:

1. In air-craft, a supporting wing system comprising several biplane elements placed over one another column-wise and a framework in column shape connected at its lower extremity to the body of the car to which latter the biplane elements are fastened, the vertical distance between any two adjoining biplane elements being always greater than the interval separating any two planes of one element.

2. In air-craft a supporting wing system comprising a plurality of biplane elements placed over one another column-wise and framework connecting said biplane elements so as to form in the whole a wing column fastened at the lower ends to the car the vertical distance between any two adjoining biplane elements being always greater than the interval separating any two planes of an element.

3. In air craft, a supporting wing system, comprising several wing columns each connected at its lower extremity with the car and each column having a plurality of biplane elements arranged vertically one above another, the distance between them being always greater than the interval separating any two planes of an element.

4. In air-craft a supporting wing system comprising a bridge framework conveniently connected at its lower extremities with the body of the car, of wing columns connected intermediate of their ends with the bridge framework, and of biplane elements arranged one over another and carried by the wing columns, the space between adjacent biplane elements being greater than the space between the uppper and lower planes of each element.

5. In an aircraft, a bridge frame work having its ends secured to the body of the car, biplane elements secured to the frame work, a wing column connected with the bridge frame work, and a plurality of biplanes carried by the column one above the other, the space between adjacent biplane elements being greater than the space between the upper and lower planes of each element.

6. In an aircraft, a bridge frame work mounted on the body of the car, a plurality of biplane elements carried by the said frame work, a plurality of wing columns pivotally connected with the bridge frame work, and a plurality of biplane elements secured to each column one above the other, the space between adjacent biplane elements being greater than the space between the upper and lower planes of each element.

7. In aircraft, a bridge frame work mounted on the body of the car, a plurality of biplane elements carried by the said frame work, a plurality of wing columns of unequal height and pivotally mounted on the frame work intermediate of their ends, and a plurality of biplane elements carried by each column one above the other, the space between adjacent biplane elements being greater than the space between the upper and lower planes of each element.

8. In air-craft with a supporting wing system comprising biplane elements connected with each other by means of frameworks fastened to the car, a wing column linked at one extremity to the body of the car, a plurality of biplane elements connected with the said column, and means for varying the wing column's inclination and hence varying the incidence of the surfaces of the biplanes, the space between adjacent biplane elements being greater than the space between the upper and lower planes of each element.

9. In air-craft with a supporting wing system comprising biplane elements connected by means of frameworks fastened to the car, a bridge framework connected at its lower extremities with the car, a plurality of wing columns carrying biplane elements connected to the bridge framework, and means for varying the inclination of the wing columns, and hence varying the incidence of the surfaces of the biplanes, the space between adjacent biplane elements being greater than the space between the upper and lower planes of each element.

In testimony whereof I have affixed my signature, in the presence of two witnesses, at Rome, this 18th day of October, 1917.

GUIDO CASTAGNERIS.

Witnesses:
LETTERN LABSCUTTA,
AUGUSTO EGGENSCHMITZ.